United States Patent [19]

Yokokawa et al.

[11] Patent Number: 4,874,416
[45] Date of Patent: Oct. 17, 1989

[54] BASE MATERIAL OF OPTICAL FIBERS AND A METHOD FOR THE PREPARATION THEREOF

[75] Inventors: Kiyoshi Yokokawa; Kazuo Koya, both of Gunma, Japan

[73] Assignee: Shin-Etsu Chemical Co., Ltd., Tokyo, Japan

[21] Appl. No.: 188,118

[22] Filed: Apr. 25, 1988

Related U.S. Application Data

[60] Continuation of Ser. No. 908,881, Sep. 15, 1986, abandoned, which is a division of Ser. No. 686,197, Dec. 26, 1984, abandoned.

[30] Foreign Application Priority Data

Dec. 28, 1983 [JP] Japan ................................. 58-251949

[51] Int. Cl.$^4$ ............................................. C03B 37/018
[52] U.S. Cl. ..................................... 65/3.12; 65/18.2; 65/29
[58] Field of Search ........................ 65/3.12, 18.2, 900, 65/29; 350/96.33, 96.34, 96.30, 96.39

[56] References Cited

U.S. PATENT DOCUMENTS

| | | | |
|---|---|---|---|
| 3,784,386 | 1/1974 | Araujo et al. | 350/96.33 X |
| 3,961,926 | 6/1976 | Asam | 65/3.12 |
| 3,981,707 | 9/1976 | Aravjo | 65/3.11 |
| 4,087,266 | 5/1978 | Irven | 65/29 |
| 4,088,388 | 5/1978 | Nakahara et al. | 350/96.30 |
| 4,123,242 | 10/1978 | Imoto | 65/29 |
| 4,165,224 | 8/1979 | Irven | 65/3.12 |
| 4,206,968 | 6/1980 | Suganuma et al. | 350/96.34 X |
| 4,257,791 | 3/1981 | Andrejco | 65/18.2 X |
| 4,294,601 | 10/1981 | Dabby | 65/18.2 X |
| 4,437,727 | 3/1984 | Treber | 350/96.30 |
| 4,453,961 | 6/1984 | Berkey | 65/3.12 |
| 4,504,114 | 3/1985 | Arrington | 350/96.34 |
| 4,586,979 | 5/1986 | Katsumata | 156/601 |
| 4,599,098 | 7/1986 | Sarkar | 65/3.12 |

FOREIGN PATENT DOCUMENTS 57-92532 6/1982 Japan .

OTHER PUBLICATIONS

Peder-Gothóni, A.-M., "Reduction of Hydroxyl Ion Diffusion in Optical Fibers", Optics Communications, vol. 54, No. 3 (6-1-85) pp. 137-140.
Schultz, P.; Proceedings of the IEEE, vol. 68, No. 10, Oct. 1980, 1187-1190.
Edahiro; Third International Conference on Integrated Optics and Optical Fiber Communications; S. F., Cal., USA; Apr. 27-29, 1981; Abstract TUC2 for Tuesday, Apr. 28, 1981.

*Primary Examiner*—Kenneth M. Schor
*Attorney, Agent, or Firm*—Jules E. Goldberg

[57] ABSTRACT

In place of the conventional rod-in-tube method, a novel method is proposed for the preparation of a high-quality base material of quartz glass for optical fibers according to which a glassy rod composed of the core portion of a larger refractive index and the first cladding layer of a smaller refractive index is first prepared by silica soot deposition by the flame hydrolysis of a gaseous silicon compound followed by dehydration and vitrification, and then the glassy rod is covered with a layer of further silica soot deposition which is subsequently converted to the second cladding layer by vitrification. The inventive base material for optical fibers is excellent in the geometry relative to the diameter of the core portion and thickness of the cladding layer as well as concentricity of the core and the cladding.

2 Claims, No Drawings

BASE MATERIAL OF OPTICAL FIBERS AND A METHOD FOR THE PREPARATION THEREOF

This is a continuation of application Ser. No. 908,881 filed Sept. 15, 1986, now abandoned, which, in turn, is a division of application Ser. No. 686,197, filed Dec. 26, 1984, now abandoned.

BACKGROUND OF THE INVENTION

The present invention relates to a glassy base material of optical fibers or, more particularly, to a base material of optical fibers having an accurately controlled ratio of the core diameter and thickness of the cladding layer and a method for the preparation thereof.

A typical method for the preparation of a glassy base material of optical fibers composed of the core and the cladding layer therearound, the refractive index of the former being larger than that of the latter, in the prior art is described, for example, in Japanese Patent Kokai 55-32716 according to which a porous sintered body in a rod-like form is first prepared by the deposition of fine glass particles formed by the flame hydrolysis of a gaseous starting material containing silicon to form the core portion and the cladding layer therearound and the porous body is vitrified by heating into a glassy base material which is enclosed by fusion in a quartz glass tube to give a base material of optical fibers.

One of the important requirements in a base material of optical fibers is an accurately controlled diameter of the core portion and the thickness of the cladding layer or the ratio thereof. In the above mentioned prior art method, which is usually called the rod-in-tube method, quartz glass tubes not always have a sufficient accuracy in the diameter and wall thickness so that it is a usual practice to select and use a quartz glass tube which satisfies the requirements for the desired dimensions of the final product or, alternatively, to control the diameter of the glassy base material by drawing to fit the available quartz glass tube. Such a method is of course very complicated and disadvantageous as an industrial method for the mass production of standard products. Moreover, most of the commercially available quartz glass tubes are manufactured by the fusion of natural quartz so that numberless tiny bubbles are unavoidably contained therein to cause a great decrease in the mechanical strength of the optical fibers produced therefrom.

SUMMARY OF THE INVENTION

It is therefore an object of the present invention to provide a glassy base material of optical fibers free from the above described problems and disadvantages in the prior art products.

Another object of the invention is to provide a novel method for the preparation of a glassy base material of optical fibers as mentioned above without using a preformed quartz glass tube.

Thus, the glassy base material of optical fibers in a rod-like form provided by the invention comprises a core portion extending in the axial direction, a first cladding layer on and surrounding the core portion and a second cladding layer made of fused synthetic silica on and surrounding the first cladding layer integrally vitrified together.

The method of the present invention for the preparation of the above described glassy base material of optical fibers comprises the steps of:

(a) forming a rod-like precursor from a soot deposit for the portion of the core and the first cladding layer by the deposition of siliceous particles by the flame hydrolysis of a gaseous starting material containing a silicon compound;

(b) dehydrating and vitrifying the precursor form into a glassy rod for the core and the first cladding layer;

(c) forming a layer of soot deposit which is a precursor of the second cladding layer on and surrounding the glassy rod obtained in the step (b) by the deposition of siliceous particles by the flame hydrolysis of a gaseous starting material containing a silicon compound; and (d) vitrifying the layer of the soot deposit to form the second cladding layer which is integrated with the glassy rod for the core and the first cladding layer.

DETAILED DESCRIPTION OF THE PREFERRED EMBODIMENTS

The first step, i.e. step (a), of the above described inventive method is the preparation of the precursor soot deposit in a rod-like form which should subsequently be vitrified into the portion of the core and the first cladding layer. This step is in principle a process of flame hydrolysis of a gaseous starting material containing a silicon compound to deposit siliceous particles. Needless to say, the refractive index in the core portion must be larger than in the cladding layer so that the precursor soot deposit also should have a distribution of the dopant concentration from the core to the outer layer. Such a soot deposit having different dopant concentrations in the core portion and in the outer layer can be obtained in the following ways.

As a first of the possible ways, the deposition of the siliceous particles is performed by the flame hydrolysis of a silicon-containing gaseous starting material doped with a dopant for the increase of refractive index by use of a single burner in such a manner that the growth of the soot deposit takes place in the axial direction to simultaneously form the core portion and the outer layer portion having a uniform dopant concentration. Such a soot deposit having a uniform dopant concentration throughout the body is then subjected to a treatment for the dissipation of the dopant from the outer layer portion prior to or in the same time as the vitrification in the following step so as to give a glassy rod having a composite structure in respect to the dopant concentrations or refractive indices in the core portion and the outer layer which is vitrified into the first cladding layer.

As a second of the possible ways, a soot deposit in a rod-like form having a composition for the core portion is first prepared on which siliceous particles having a composition for the cladding layer are further deposited to form a layer of soot deposit which to be vitrified into the first cladding layer and the thus formed soot deposit of composite structure is vitrified altogether.

The silicon compound to be subjected to the flame hydrolysis may be silicon tetrachloride conventionally used in the art and the dopant added to the silicon compound may be a germanium compound such as germanium tetrachloride or a phosphorus compound such as phosphoryl chloride having an effect of increasing the refractive index of silica glass.

The thus obtained porous soot deposit having a composite structure is then subjected to the dehydration and vitrification to give a glassy rod for the core portion and the first cladding layer. The dehydration is performed according to a known method by exposing the porous soot deposit at an elevated temperature to an atmosphere containing a halogen such as chlorine or a halogen compound and the dehydrated porous body is then vitrified by further increasing the temperature.

It is desirable in the present invention that the thickness of the cladding layer in the thus obtained glassy rod having a composite structure for the core portion and the first cladding layer is controlled in the range from 3 to 80% of the overall thickness of the cladding after the second cladding layer is formed on and around the first cladding layer in the subsequent steps. When the thickness of the first cladding layer is smaller than the above range, the loss of the light energy by scattering is increased due to the considerable propagation of the light through the interface between the first and the second cladding layers. Moreover, the increment in the amount of soot deposition in the subsequent step must be correspondingly large so that the error in the overall thicness of the cladding layer is unavoidably increased in comparison with the target value. When the thickness of the first cladding layer is larger than the above mentioned upper limit, on the other hand, certain disadvantages are sometimes caused in respect of the production cost when, as a possibility, the percentages of unacceptable soot deposits in respect of the dimensions and distribution of the refractive index in the core portion is large accompanying the loss of the first cladding layer having been deposited so much although no problems are involved in the properties of the product. Furthermore, the thickness of the second cladding layer should be so small corresponding to the unduly large thickness of the first cladding layer so that the accuracy of control by the second cladding layer is decreased.

Although the preferable range of the relative thickness of the first cladding layer is given as 3 to 80% of the overall thickness of the finished cladding as a whole as is mentioned above, the more preferable range are somewhat different between the multi-mode optical fibers and the single mode optical fibers. For example, the extent of the diffusion of the light into the cladding layer is relatively small in the multi-mode optical fibers so that even a first cladding layer of a considerably small thickness may have a sufficient effect. In this case, therefore, the thickness of the first cladding layer is preferably in the range from 3 to 60% of the overall thickness of the cladding. In the single mode optical fibers, on the other hand, the first cladding layer should preferably have a relatively large thickness due to the considerably large diffusion of light into the cladding layer in transmission so that the thickness of the first cladding layer should preferably be controlled within a range from 10 to 80% of the overall thickness of the cladding.

In the next place, the glassy rod for the core and the first cladding layer is subjected to the deposition of a further thickness of soot formed by the flame hydrolysis in the step (c). This process is performed by the so-called outward CVD method in which the glassy rod is rotated around its axis and the soot is deposited on the rotating glassy rod so that very high uniformity can be ensured in the thickness of this second soot deposition which is converted into the second cladding layer of very high concentricity in the subsequent step. In this method, a further advantage is obtained in the easy control of the amount of soot deposition by the measurement of the increasing weight by means of a load cell and the like at the support of the rotating body as a whole.

This step of soot deposition for the second cladding layer can be performed also by the method of axial deposition disclosed in Japanese Patent Kokai 55-116638 although this method is disadvantageous due to the low accuracy in the determination of the amount of soot deposition and the poor concentricity of the second cladding layer relative to the center axis of the glassy rod for the core and the first cladding layer.

It is preferable that this step of the soot deposition for the second cladding layer is preceded by smoothing of the surface of the glassy rod on which the soot is deposited. Such a surface smoothing of the glassy rod can be performed, for example, by flame polishing and the like method with a plasma flame or in an electric resistance furnace in an anhydrous condition.

When it is anticipated that the final diameter of the body after the soot deposition for the second cladding layer would be too large as a result of the excessively large diameter of the glassy rod for the core and the first cladding layer, it is preferable that the glassy rod is drawn and stretched so as to be imparted with a somewhat reduced diameter before the further soot deposition. The inspection of the glassy rod for the structural parameters prior to the further soot deposition for the second cladding layer should preferably be performed by the non-destructive determination of the profile of the distribution of the refractive index in which measurement is undertaken of the refracting angle of light transmitting within a plane perpendicular to the axis.

The layer of the soot deposit for the second cladding layer formed on the glassy rod for the core and the first cladding layer in the step (c) is then vitrified in the subsequent step (d) to give the second cladding layer. Although it is not essential that this vitrification is accompanied by the dehydration as in the first cladding layer, it is of course desirable that the soot deposit is dehydrated prior to or simultaneously with the vitrification in the same manner as in the step (b) when the infuence of the hydroxyl groups in the second cladding layer cannot be disregarded to the core due to the small thickness of the first cladding layer.

In the inventive method comprising the above described steps (a) to (d), a base material for optical fibers is obtained which is composed of the core portion, the first cladding layer and the second cladding layer made of synthetic quartz. The first cladding layer is also preferably mainly composed of silica synthesized by the vapor phase method like the core portion and the composition thereof is either the silica per se or doped with boron or fluorine to be imparted with a smaller refractive index than that of the core portion which is formed of the silica with a dopant to be imparted with an increased refractive index or silica per se. It is also desirable that the content of hydroxyl groups should be low both in the core portion and in the first cladding layer. On the other hand, the content of hydroxyl groups in the second cladding layer may be somewhat larger than in the core portion and the first cladding layer since the adverse effect in respect of the transmission loss of light due to the hydroxyl groups is relatively small.

Following is a summary of the advantages obtained by the present invention.

(1) the soot deposit for the second cladding layer is deposited on the glassy rod prepared in the step (b) after exact determination of the diameter and thickness of the core portion and the first cladding layer so that the deposition of the silica soot thereon can be performed to give an exact amount of deposition to impart the outer dimension of the second cladding layer with a high accuracy. While it is important in the single mode optical fibers, in particular, that the cut-off wave length $\lambda_c$ expressed by the equation $$\lambda_c = 2\pi a \sqrt{n_1^2 - n_2^2} / 2.405, \quad (I)$$

in which $\lambda_c$ is the cut-off wave length, a is the diameter of the core, $n_1$ is the refractive index of the core portion and $n_2$ is the refractive index of the cladding layer, is in good coincidence with the calculated vlaue, a very good coincidence can readily be obtained by the inventive method.

(2) Since the outermost layer, i.e. the second cladding layer, is formed of the synthetic quartz deposited by the outward CVD method, no microscopic bubbles are contained therein so that the optical fibers prepared from the inventive base material have a greatly improved tensile strength.

(3) The above mentioned step (c) is performed only on the glassy rods of the core and the first cladding layer prepared in the step (b) and found to be acceptable by the inspection for the characteristic properties required for the base material so that the loss in the production can be minimized.

(4) Needless to say about the interface between the core portion and the first cladding layer, no bubbles are contained at or in the vicinity of the interface between the first and the second cladding layers because the second cladding layer is formed by the deposition of silica soot so that the transmission loss of light can be greatly decreased.

(5) The second cladding layer is formed by the deposition of silica soot on the glassy rod for the core and the first cladding layer so that a very uniform overall thickness of the cladding layers can readily be obtained and the base material obtained by the method has a very small eccentricity of the core and cladding in comparison with those prepared by the conventional rod-in-tube method.

As is summarized in the above, the formation of the second cladding layer follows the formation of the first cladding layer in advance so that control of the diameter can be performed very easily. Furthermore, no dehydration is required in the formation of the second cladding layer so that the desired base material of optical fibers can be manufactured with an outstandingly low production cost.

Following are the examples to illustrate the method of the present invention in more detail.

EXAMPLE 1

Fine particles of doped silica glass were produced by the flame hydrolysis in an oxhydrogen flame formed by supplying a gaseous mixture of vapors of silicon tetrachloride at a rate of 105 ml/minute, germanium tetrachloride at a rate of 20 ml/minute, phosphoryl chloride at a rate of 3 ml/minute and argon as carrier gas at a rate of 370 ml/minute, hydrogen gas at a rate of 2.8 liters/minute, argon gas at a rate of 0.6 liter/minute and oxygen gas at a rate of 5.6 liters/minutes to a quartz-made concentrically 4-fold tubular burner through the center aperture to the outermost aperture in this order and the silica particles were deposited on a rotating refractory receiver bed under continuous retreat in the axial direction so that the soot deposit was grown in the axial direction to form a cylindrical deposit having a diameter of 50 mm.

This soot deposit was exposed to an atmosphere containing 20% by volume of chlorine gas at 1000° C. so as to dissipate the germanium oxide contained in the peripheral portion of the soot deposit followed by the vitrification at 1500° C. in an atmosphere of helium into a glass rod of 25 mm diameter having a composite structure composed of the core portion doped with germanium and phosphorus and the peripheral layer deficient in the content of germanium corresponding to the first cladding layer. The refractive index in this glassy rod had an approximately square distribution with about 1.0% of the maximum difference in the refractive index. The diameter of the core portion was 17.5 mm and the thickness of the cladding layer was 3.75 mm.

Further, silica soot was deposited on this glassy rod for the core and the first cladding layer to give an overall outer diameter of about 85 mm which was intended to be a base material for spinning optical fibers having a core diameter of 50 μm and a thickness of the cladding layer of 125 μm. The soot deposit on the glassy rod was vitrified to give a base material for optical fibers having a diameter of 43.75 mm.

The thus obtained base material was melted by heating in an electric furnace at 2100° C. and spun into optical fibers having a diameter of 125 μm. The average core diameter in these optical fibers was about 50 μm and the variation thereof was ±1 μm or smaller.

EXAMPLE 2

A rod-like soot deposit for the core portion having a diameter of 20 mm was prepared by use of the same quartz-made burner as used in Example 1 with supply of silicon tetrachloride vapor at a rate of 20 ml/minute and germanium tetrachloride vapor at a rate of 2 ml/minute together with argon gas as the carrier to the center aperture of the burner to give a soot deposit followed by continuous heating of the lateral surface thereof by use of an auxiliary burner. Further, a cladding soot layer of pure silica was deposited on and around this soot rod to give an overall diameter of 75 mm by supplying silicon tetrachloride vapor alone to a cladding burner followed by vitrification in an atmosphere containing 0.5% by volume of chlorine gas. The diameter of the thus obtained glassy rod for the core and the first cladding layer was 35 mm and the diameter of the core portion therein was 8 mm.

When the desired cut-off wavelength is 1.18 μm, the core diameter should be 8.4 μm as calculated from the equation (I) given above and the correction factor obtained experimentally.

With an object to obtain a base material suitable for the preparation of single mode optical fibers having a fiber diameter of 125 μm, the above prepared glassy rod was drawn to give a reduced diameter of 15 mm and further soot deposition was performed on and around this glassy rod followed by vitrification to give a base material for optical fibers having a final diameter of 51 mm.

The base material was melted by kneading in an electric furnace at 2100° C. and spun into optical fibers of which the cut-off wavelength as determined was 1.19 μm in good coincidence with the target value.

What is claimed is:

1. A method for the preparation of a glassy base material for optical fibers comprising a rod-shaped core portion, a first cladding layer on and surrounding the core portion and a second cladding layer formed of fused synthetic silica on and surrounding the first cladding layer integrally vitrified together which comprises the steps of:

(a) forming a soot preform as a rod-like soot deposit of silica particles for the core and first cladding layer by axial deposition of siliceous particles produced by the flame hydrolysis of a gaseous starting material containing a silicon compound onto a rotating target, as a growing rod soot preform;

(b) dehydrating and vitrifying the soot preform into a glassy rod of the core portion and the first cladding layer;

(c) forming a layer of silica soot deposit as a second cladding layer soot preform on and surrounding the glassy rod obtained from step (b) by the deposition of siliceous particles produced by the flame hydrolysis of a gaseous starting material containing a silicon compound;

(d) controlling the amount of soot deposition of the second cladding so that the thickness of the first cladding layer is in the range from 10 to 80 percent of the overall thickness of the total cladding layer after the second cladding layer is formed, the deposition control being effected by measuring the increase in weight of the rod as the second cladding is being formed using a load-measuring-means and controlling the degree of deposition of the second cladding in response to the measured increase in weight so as to provide said 10 to 80 percent of said overall thickness; and (e) vitrifying the layer of the soot deposit to form the second cladding layer on and surrounding the glassy rod integrally.

2. The method of claim 1 wherein the surface of the glassy rod formed in step (b) is smoothed prior to carrying out step (c).

* * * * *